3,846,307
FILTER HOUSING WITH REMOVABLE DIAPHRAGM AND SEAL MEANS THEREFOR
Raymond M. Petrucci, Middlebury, and Arthur W. Schnick, Meriden, Conn., assignors to AMF Incorporated
Filed June 25, 1973, Ser. No. 373,251
Int. Cl. B01d 29/24
U.S. Cl. 210—323                    7 Claims

ABSTRACT OF THE DISCLOSURE

A filter having a sump and cover releasably connected together by a clamp to form a housing provided with a rigid diaphragm and singular means providing a seal between both the sump and the cover, and the sump and the periphery of the diaphragm.

---

This invention relates generally to liquid filters and more particularly to an improved interlock and seal between a removable diaphragm and two filter housing portions.

The present invention is concerned with filters which are provided with covers and sumps to form the filter housings. A clamp is used to releasably connect a cover and sump together to facilitate assembly and disassembly of such a housing. A diaphragm, preferably rigid and supporting one or more filter cartridges, is provided to divide the space in the housing into an inlet chamber and an outlet chamber. The cover is usually provided with both the inlet and outlet connections leaving the sump free for removal so the filter cartridges can be replaced and accumulated contaminates can be dumped.

Although filters having this type of construction are not new, here-to-fore it has been difficult to support such diaphragms and to adequately seal such devices.

Accordingly, an object of the present invention is to provide improved means for supporting a rigid diaphragm in a filter housing formed by a cover and a sump which are releasably clamped together.

Another object of the present invention is to provide the foregoing filter construction having means for holding the diaphragm against movement and for providing a positive seal between the filter housing and the periphery of the diaphragm.

And, another object of the present invention is to provide the foregoing construction in which the seal means also provides a positive seal between the cover and the sump.

The foregoing and other objects and advantages will appear more fully hereinafter from a consideration of the detailed description which follows, taken together with the accompanying drawings wherein one embodiment of the invention is illustrated by way of example. It is to be expressely understood, however, that the drawings are for illustration purposes only and are not to be constructed as defining the limits of the invention.

Figure 1:
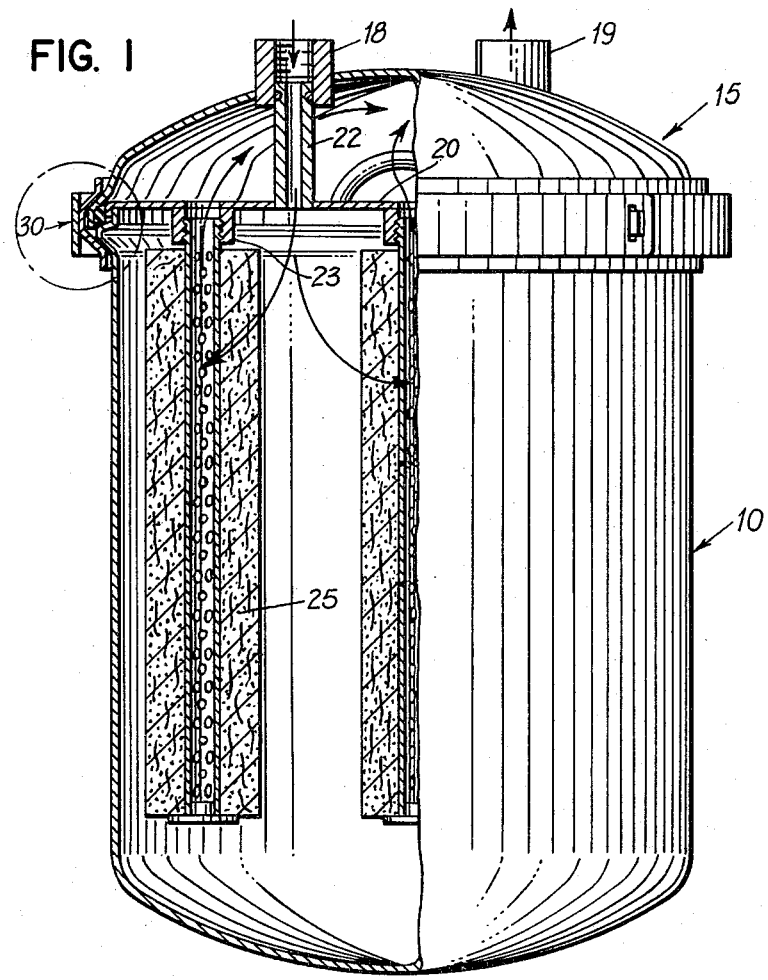
FIG. 1 is an elevational view of a filter housing partially broken away to illustrate the present invention.
Figure 2:
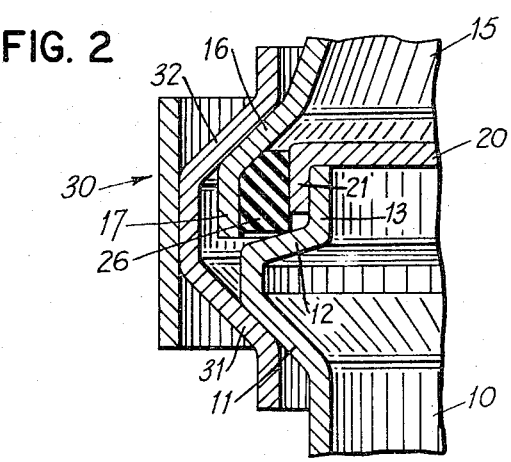
FIG. 2 is an enlarged fragmentary sectional view of the filter housing as indicated on FIG. 1.

Referring now to the drawings, a filter housing in accordance with the present invention is formed by a sump 10 and a cover 15 each having an open end; the open ends being releasably joined or connected together by a clamp 30. A rigid type diaphragm 20 is mounted or supported in the housing and divides the space therein into an inlet of contaminated liquid chamber, and an outlet or filtered liquid chamber. A single seal means in the form of a ring 26 is provided to seal or prevent leakage across the diaphragm 20 between the chamber and also to seal or prevent leakage from the filter housing.

The sump 10 is an elongated tubular member 10 which is closed at one end which, as shown, is at the bottom thereof, and is provided with an outwardly extending deformation adjacent the annular wall portion 13 at the open end thereof. This deformation is of a V-shape in cross-section providing an annular flared wall portion 11 to be engaged by a surface 31 of the clamp 30 and an annular wall portion 12 forming a seat for the ring seal member 26.

The cover 15 is generally of a dome shape having an annular flared wall portion 16 and, preferably, an annular skirt wall portion 17 providing an enlarged open end of the cover for receiving the seal 26 and the open end of the sump 10. The angles of offset of the flared wall portions 12 and 16 from the axis of the housing are substantially equal but opposite to each other. The cover 15 is also provided with inlet and outlet fittings 18 and 19, as shown.

The rigid diaphragm 20 is supported on the open end of the sump 10 and is provided with an annular peripheral flange 21 which is fitted to and encircles the annular end wall portion 13 of the sump. The diaphragm 20 divides the area within the housing into an outlet or filtered liquid chamber defined by the cover 15 and in communication with the outlet 19, and an inlet or contaminated liquid chamber defined by the sump 10.

The diaphragm 20 is provided with a standpipe or conduit 22 which connects the inlet chamber to the inlet 18, and one or more cartridge adapters 23 each having a central opening through the diaphragm. A filter cartridge 25, in this instance two are shown in FIG. 1, disposed in the inlet chamber within the sump 10 is appropriately connected to each adapter 23. It should be understood that a filter made in accordance with the present invention may be provided with one or more cartridges 25 with an adapter 23 for each cartridge depending upon the requirements of the system in which the filter is to be used.

For assembly, one or more cartridges 25, as required are suitably connected by adapters 23 to the diaphragm 20 which is then fitted on the open end of the sump 10. The ring seal 26 may be fitted on the flange 21 of the diaphragm 20 before or after the diaphragm is mounted on the sump 10. At this time, however, the seal 26 should be in contact with the seat surface or wall portion 12 of the sump 10. The sump 10 and cover 15 are fitted together and the clamp 30 is closed and locked which reduces the effective diameter of the clamp. This action causes the wall portions 31 and 32 of the clamp 30 acting on the flared wall portions 11 and 16 to urge the sump 10 and cover 15 toward each other thereby compressing the ring seal 26.

When the seal 26 is under compression it intimately contacts the wall portion 12 of the sump 10, the wall portions 16 and 17 of the cover 15 and the flange 21 of the diaphragm 20 thereby forming a seal between the sump 10 and cover 15 and simultaneously between the sump 10 and the periphery of the diaphragm 20.

Alternatively, the ring seal 26 may be fitted into the open end of the cover 15 within the wall portions 16 and 17. The diaphragm 20, before or after it is mounted on the open end of the sump 10, is then fitted into the seal 26.

For disassembly, the clamp 30 is released and the sump 10 is removed. The diaphragm 20 normally remains in place leaving the cartridges 25 exposed for replacement.

In operation, contaminated liquid received at the inlet 18 flows into the sump 10 through the conduit 22. The filtrate passing through the filter cartridges 25 flow into the chamber defined by the cover 5 from where they are discharged through the outlet 19 while the contaminates remain trapped within the sump 10.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:
1. In a filter, the novel combination comprising:
a cover member and a sump member forming a housing for the filter, each of said members having an open end;
a rigid diaphragm supported on the open end of said sump member dividing the space within the formed housing into two separate chambers;
annular seal means encircling said diaphragm and when placed under compression holding said diaphragm against movement and simultaneously sealing against leakage from said housing between said members and from one of said chambers to the other between said housing and diaphragm; and
clamp means releasably connecting the open ends of said members together and placing said annular seal means under compression between said members when connected together by said clamp means.

2. In a filter, the novel combination in accordance with claim 1, and
the open end of said cover being sufficiently enlarged to encircle said annular seal means, said diaphragm, and the open end of said sump member.

3. In a filter, the novel combination in accordance with claim 2, and
said sump member having an annular end wall portion of substantially constant diameter at its open end; and
said diaphragm having a peripheral flange fitted around said annular end wall portion and within said annular seal means.

4. In a filter, the novel combination in accordance with claim 3, and
said sump member having an annular surface adjacent to and of greater diameter than said end wall portion forming a seat for said annular seal means.

5. In a filter, the novel combination in accordance with claim 4, and
said sump member having an annular outwardly extending deformation providing said annular surface and a flared wall portion;
said enlarged end of said cover member being formed to provide a flared wall portion disposed at an angle opposite to said flared wall portion of said sump member; and
said clamp means having two annular wall portions spaced from one another, each being disposed parallel to and engaging a different one of said flared wall portions.

6. In a filter, the novel combination in accordance with claim 5, and
said annular seal means being a ring member, when placed in compression intimately contacting said enlarged end of said cover member, said seat surface of said sump member and said flange of said diaphragm.

7. In a filter, the novel combination in accordance with claim 6, and
said ring member being of a deformable sealing material.

References Cited
UNITED STATES PATENTS

| | | | |
|---|---|---|---|
| 3,034,652 | 5/1962 | Hobson, Jr. | 210—445 X |
| 2,727,634 | 12/1955 | O'Meara | 210—445 X |
| 813,429 | 2/1906 | Hull | 210—450 |
| 2,671,564 | 3/1954 | Fricke | 210—450 X |
| 3,186,551 | 6/1965 | Dornauf | 210—323 X |
| 3,473,663 | 10/1969 | Winslow | 210—323 X |
| 3,442,390 | 5/1969 | Petrucci et al. | 210—323 |

FRANK A. SPEAR, JR., Primary Examiner

U.S. Cl. X.R.

210—450